Sept. 8, 1953　　　　A. D. MARGISON　　　　2,651,359
FUSELAGE EMBRACING HANGAR DOOR
Filed June 23, 1949　　　　　　　　　　　　3 Sheets-Sheet 1
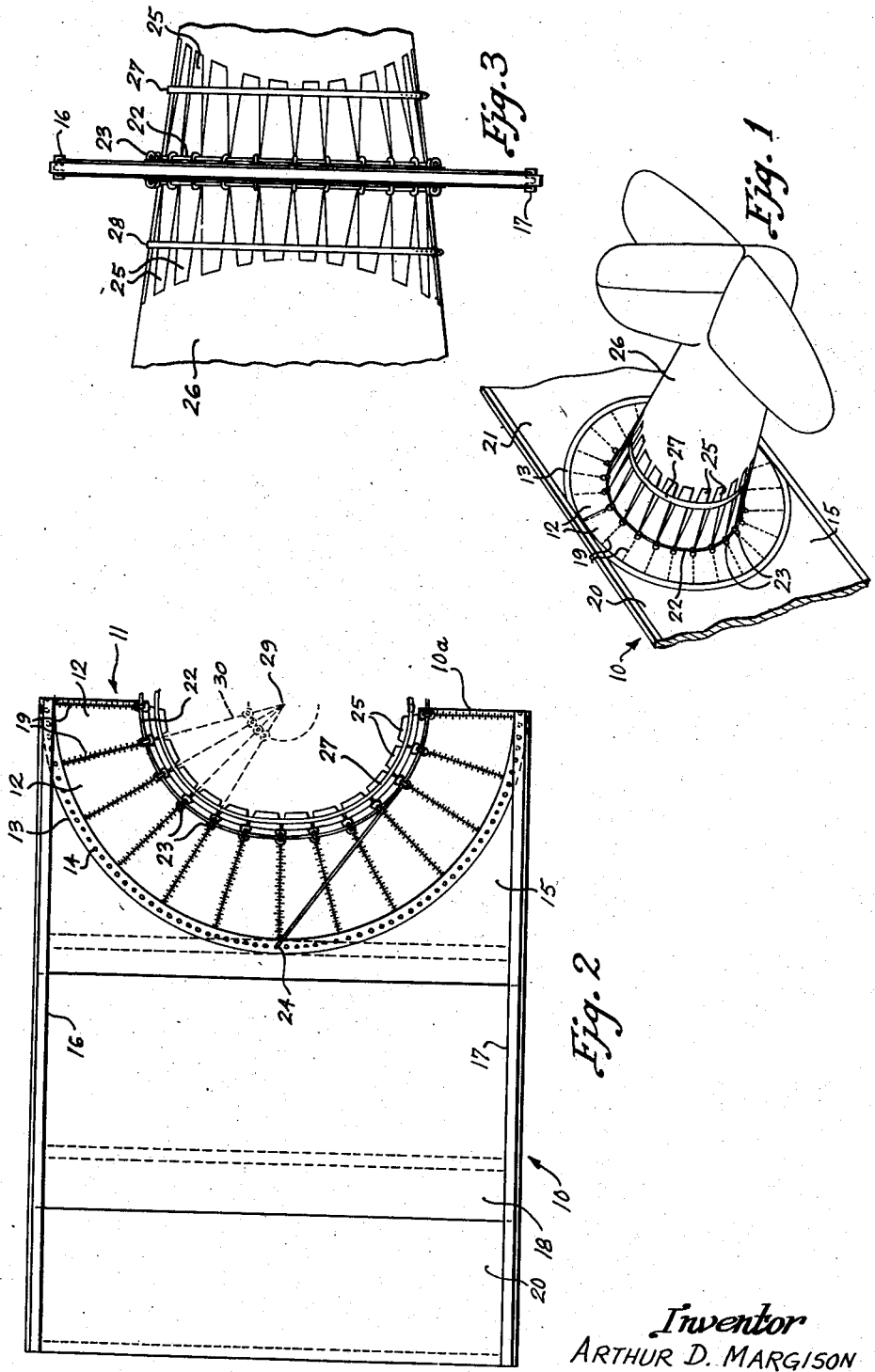
Inventor
ARTHUR D. MARGISON
By: Fetherstonhaugh & Co.
Att'ys

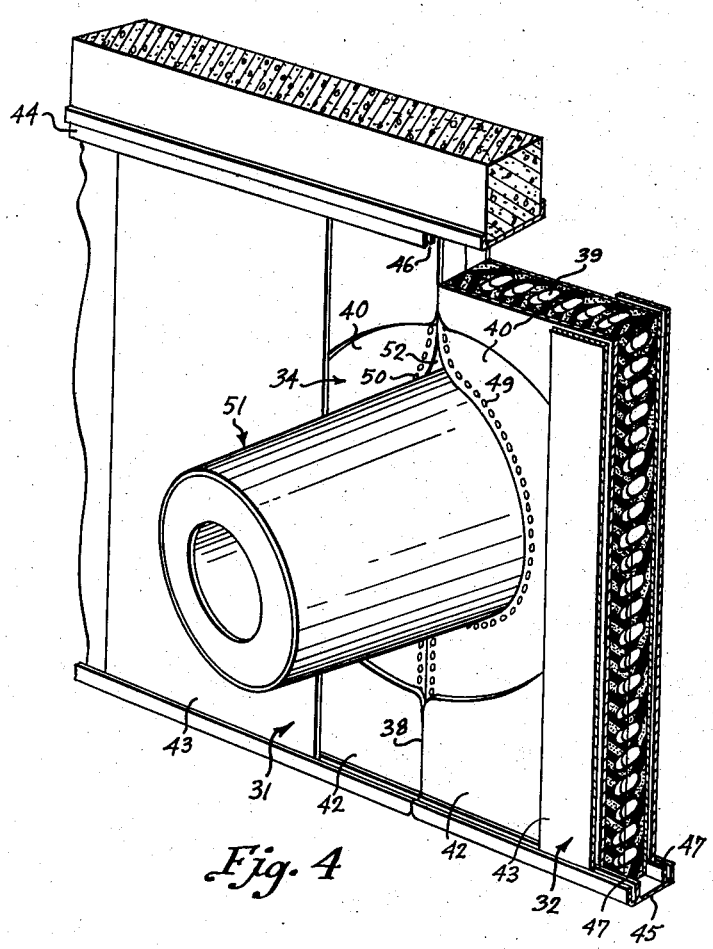

Sept. 8, 1953 A. D. MARGISON 2,651,359
FUSELAGE EMBRACING HANGAR DOOR
Filed June 23, 1949 3 Sheets-Sheet 3
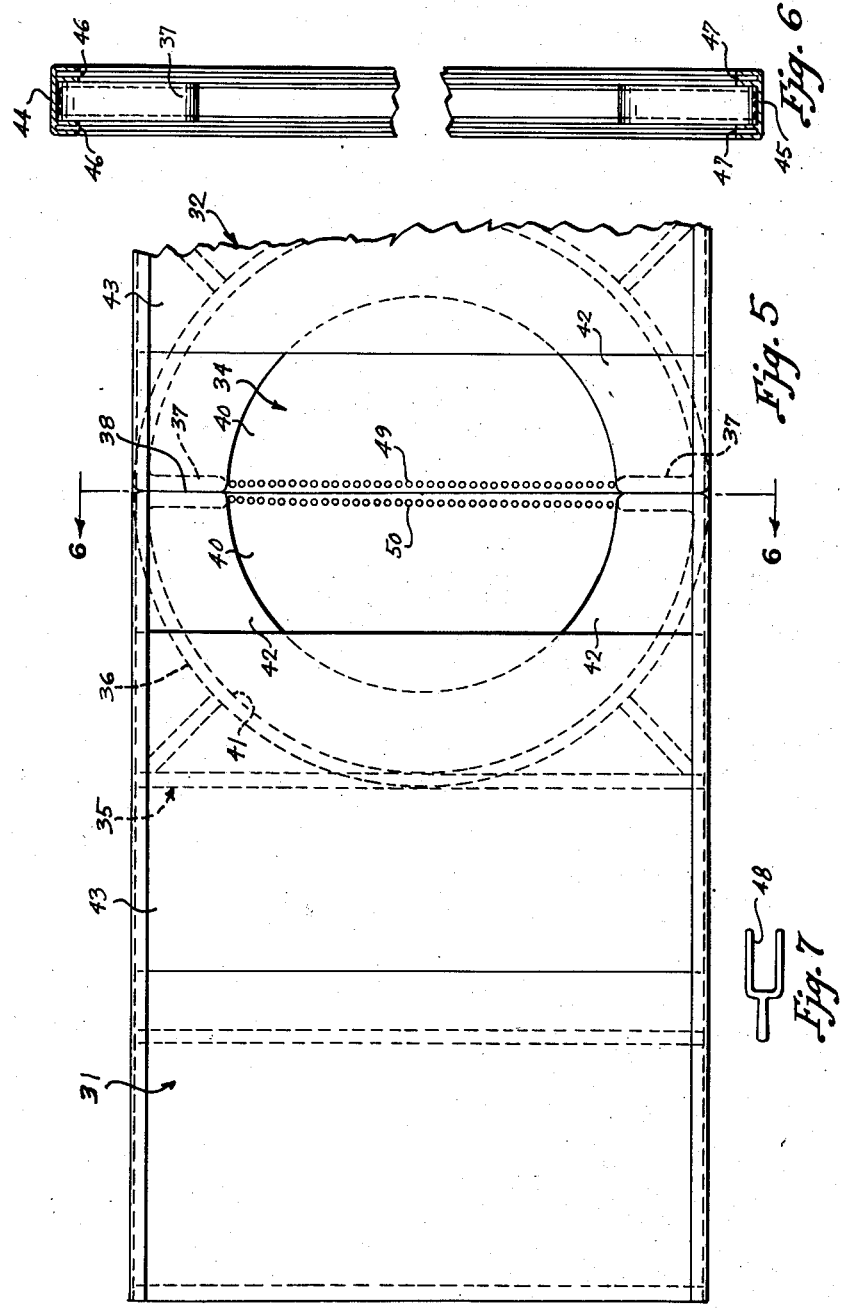
Inventor
ARTHUR D. MARGISON
By: Featherstonhaugh & Co.
Att'ys Patented Sept. 8, 1953

2,651,359

UNITED STATES PATENT OFFICE 2,651,359

FUSELAGE EMBRACING HANGAR DOOR

Arthur Donald Margison, Toronto, Ontario, Canada

Application June 23, 1949, Serial No. 100,804

1 Claim. (Cl. 160—180)

This invention relates to improvements in aircraft hangars and specifically to an improved type of movable section or door of such construction that the storage space of the hangar may be substantially increased.

Up to the present time, problems have arisen in respect to the storage space of aircraft hangars and particularly for the housing of large aircraft under emergency conditions in cold climates. For instance, where a hangar is already completely housing aircraft to capacity and it is required to house further aircraft for a period of time, either for repair work or merely for protection against freezing conditions, it is not possible to accommodate the additional aircraft without removing one or more of those already housed or having regard to the size of the hangar it might not be possible to house the entire structure of a large aircraft. As a result, such aircraft must be left subject to the weather conditions prevailing which may result in substantial difficulty to get them airborne again when necessary.

The present invention makes it possible to house vital parts of aircraft such as the forward end thereof, including the motors, to protect them against the elements and may function also as a means to enclose parts of aircraft requiring repair and thus protecting the workmen against weather conditions which would make the necessary repair work impossible.

It is an object of the invention to provide in an aircraft hangar, a pair of movable sections such as doors which cooperate in their action to engage surfaces of an aircraft fuselage to occlude weather from the interior of the hangar structure. Such sections may be of a slidable type if desired and this is preferred. The particular structure of the section components associated with the support of the section is not important insofar as the concept of this invention is concerned, the latter specifically relating to the means for embracing the aircraft in combination with the movable section and which is carried thereby.

Other objects of the invention will be appreciated by a study of the following specification taken in conjunction with the accompanying drawings.

In the drawings,

Figure 1 illustrates a perspective view of the tail assembly of an aircraft fuselage projecting from an aircraft hangar through fuselage embracing doors according to this invention.

Figure 2 is an elevation of one of the doors which may be employed according to Figure 1 disclosing a particular type of structure which would be suitable and which is formed of a plurality of flaps controllable in their fuselage embracing dimension by a simple zipper mechanism.

Figure 3 is an end elevation of a door according to Figure 2 illustrating the manner in which the same may be manipulated to embrace an aircraft fuselage.

Figure 4 is a cut-away perspective view of an alternative form of door according to the invention which includes a depressible or deformable medium.

Figure 5 is an elevation of a pair of doors according to the concept of Figure 4.

Figure 6 is an enlarged sectional view on the line 6—6 of Figure 5.

Figure 7 is a plan view of a locking pin used in conjunction with the doors according to the modification of Figure 5.

It will be readily apparent that many modifications of the invention herein disclosed will be obvious to skilled persons. The illustrations disclosed herein are choices of preferred structures which are practical both from operation and cost standpoints and which accomplish the objects of the invention.

The one preferred type is illustrated in Figures 1 to 3 and in this case a sliding door section 10 has a semi-annular fuselage embracing member 11 defining a portion of the "working edge" 10a of the section being in the form of a plurality of flaps 12 of cloth or other suitable material which is preferably of the weather-proof type. Therefore, a rubberized canvas may be employed or resin impregnated fabrics of various types. The periphery of the fuselage embracing member is fastened to the semi-circular flange 13 by suitable rivets 14, the flange being a part of a centrally disposed member 15 of sheet metal or the like. Preferably, the upper and lower edges of the door section include guide means 16 and 17 carrying a weather-occluding panel 18 which may be moved to a position entirely covering the fuselage embracing member when the door panel is employed in the conventional manner.

In use, when door sections according to the modification disclosed in Figures 1 to 3 are employed in an aircraft hangar, the aircraft may be moved through the open doorway to the extent of disposing the front portion thereof, i. e. wings and motors, within the hangar. The weather-occluding panels 18 on the open doors are slid from normal position to uncover the fuselage embracing members and the sections 10 are moved towards each other and the intervening fuselage of the aircraft to engage the fuselage embracing member 11 with the fuselage of the aircraft. In this connection the flaps 12 are joined to one another by a conventional zipper device 19, the zipper closure members of which must be moved by the operator to the outward position to leave the flaps substantially free. The two movable sections, such as the doors 20 and 21, are brought together and in the area of the embracing members 11, extend about the fuselage. A cord 22 is passed through all of the zipper closure members 23 of both door sections and one end of the cord 22 is fastened as at 24 to a suitable anchorage such as the flange 13. The other free end of the cord (not shown) is then drawn by an operator to cause the zipper closure members to proceed radially inwardly, to cause the members 11 to embrace the fuselage at this point. The free portions 25 of the flaps 12 are laid along the fuselage surface 26 as illustrated in Figure 3. Finally, suitable straps 27 and 28 are passed about the fuselage to bind down these free flaps.

In this way, therefore, the front portion of the aircraft is enclosed in the hangar shielded from the elements without it being necessary to introduce the complete aircraft to the hangar. Thus, the aircraft may be protected in a hangar where other aircraft are housed and there would not be sufficient space for further aircraft. Alternatively, of course, and particularly in the case of repairs to certain parts of the aircraft, the tail end of the fuselage or a wing might be housed within the hangar in a similar way.

It will be noted that in Figure 2 the flaps 12 extend radially and inwardly a predetermined distance toward the theoretical central point 29 at which the various zipper closure members 23 will be disposed closely together when the door section is prepared for normal or conventional use. When the zipper closure members are brought to this most inward position defined by the chain line 30, two methods may be employed for closing the remainder of the space. Thus, the flaps, if desired, may be made to extend very close to the theoretical central point 29 and the ends merely tied with a suitable string. On the other hand, a pair of circular plates may be employed to close the opening left when two such sections are brought together. Such may be in a simple form of a pair of discs of sheet metal (not shown) disposed on either side of the flap surfaces and joined in the middle by a bolt. In any case, it will be appreciated that there will be a number of ways of providing a suitable inward terminus to the flaps. In some cases attention to this detail may not be necessary where the weather-occluding panel 18 is considered sufficient.

The preferred form of the invention is illustrated in Figures 4 to 7 and embodies a pair of slidable sections 31 and 32, each of which comprises a substantially conventional structure having a deformable portion 34. In this case, the frame 35 of the door section in the area of the deformable region incorporates a semi-circular framepiece 36 having inwardly depending ends 37 at the "working edge" 38 of the door section. A continuous body of a cellular elastomer such as an aerated or foamed latex cushioning material preferably of the type having cavities 39 (Figure 4) is employed for the fuselage embracing member 40 of the deformable type.

This embodiment of the present invention results in a particularly practical and simple structure. In this case the deformable member 40 is preferably cemented only at its peripheral surface 41 to the semi-circular framepiece 36. The inwardly extending side walls 42 of the framepiece 36 are not cemented or otherwise bonded to the deformable member 40. The outer surfaces of the deformable member 40 may be sprayed or otherwise coated with a weather-protective coating.

In this case also, a weather-occluding panel 43 may be employed which may be moved to a position to cover the deformable member when the latter is not in use. In such instance the upper and lower edges of the section may be comprised of the channels 44 and 45 having the guideways 46 and 47 carrying the weather-occluding panels.

A very simple method may be employed for joining abutting edges of the deformable portions of a pair of sections and in this connection I prefer to employ a plurality of fastening forks 48 which are passed into oppositely located sockets 49 and 50 in abutting sections.

In use, the weather-occluding panels 43 are moved away from the deformable members thereof and the doors are moved inwardly to engage a fuselage generally indicated by numeral 51 in Figure 4. At this point the operator may insert a plurality of forks into the various sockets to cause the parted edges 52 of the deformable members to be drawn together. In this connection, the sockets are preferably formed in a manner such that a liner (not shown) in the form of a sleeve of a fibrous material, if desired, serves as a guide for the tynes of the forks. This avoids tearing of the deformable members in the region of their sockets.

A particular advantage of the deformable member illustrated in the modification of Figures 4 to 6 is that pressures against the fuselage structure are of little consequence and therefore, no damage can result to the fuselage as the door sections are moved to the embracing position. In this connection it is desirable to provide some means of assuring that the weather-occluding panels 43 are withdrawn to expose the deformable members. These panels are therefore freely slidable and may include a soft bumper (not shown) so that in the event the operator does not take sufficient precaution the aircraft fuselage will not be damaged.

It will be understood in the foregoing specification that the term "fuselage" is designed to include as well the wings of the aircraft. It is intended that the present disclosure should not be construed in any limiting sense other than that indicated by the scope of the following claim.

What I claim as my invention is:

In an aircraft hangar door for cooperation with a similar aircraft hangar door, the said two doors uniting in use along mating edges, the improvement of forming said door with a fuselage cut-out in its mating edge and of mounting a deformable door panel member on said door to normally occupy and fill said aforementioned fuselage cut-out, said deformable door panel member being deformable inwardly of the mating edge of which it normally forms a part to permit the fuselage of an aircraft to enter into said fuselage cut-out of said door, said deformable door panel member comprising a sheet of cellular elastomer.

ARTHUR DONALD MARGISON.

References Cited in the file of this patent

UNITED STATES PATENTS

| Number | Name | Date |
| --- | --- | --- |
| 1,312,130 | Merrill et al. | Aug. 5, 1919 |
| 2,060,706 | Vinal | Nov. 10, 1936 |
| 2,194,258 | Allen | Mar. 19, 1940 |
| 2,278,050 | Allen | Mar. 31, 1942 |
| 2,279,572 | Kann | Apr. 14, 1942 |
| 2,420,186 | Miller | May 6, 1947 |